(12) United States Patent
Filippi (10) Patent No.: US 11,021,990 B2
(45) Date of Patent: Jun. 1, 2021

(54) SHROUD SEALING FOR A GAS TURBINE ENGINE

(71) Applicant: General Electric Company, Schenectady, NY (US)

(72) Inventor: Sergio Filippi, Montgomery, OH (US)

(73) Assignee: General Electric Company, Schenectady, NY (US)

( * ) Notice: Subject to any disclaimer, the term of this patent is extended or adjusted under 35 U.S.C. 154(b) by 95 days.

(21) Appl. No.: 16/225,371

(22) Filed: Dec. 19, 2018

(65) Prior Publication Data

US 2020/0200034 A1 Jun. 25, 2020

(51) Int. Cl.
*F01D 11/12* (2006.01)
*F01D 25/24* (2006.01)

(52) U.S. Cl.
CPC ............ *F01D 11/122* (2013.01); *F01D 25/24* (2013.01); *F05D 2240/11* (2013.01); *F05D 2240/14* (2013.01); *F05D 2300/6033* (2013.01)

(58) Field of Classification Search
CPC .......... F01D 11/00; F01D 11/08; F01D 11/12; F01D 11/122; F01D 11/14; F01D 11/16; F01D 11/18; F01D 25/24; F01D 25/246; F05D 2240/10; F05D 2240/11; F05D 2240/14; F05D 2300/5021; F05D 2300/50212; F05D 2300/6033
See application file for complete search history.

(56) References Cited

U.S. PATENT DOCUMENTS

| | | |
|---|---|---|
| 4,883,405 A | 11/1989 | Walker |
| 6,984,106 B2 | 1/2006 | Thompson |
| 7,338,253 B2 | 3/2008 | Nigmatulin |
| 8,070,427 B2 | 12/2011 | Snook et al. |
| 8,206,096 B2 | 6/2012 | Prentice et al. |
| 9,080,463 B2 | 7/2015 | Denece et al. |
| 9,689,273 B2 | 6/2017 | Jones et al. |
| 9,874,104 B2 | 1/2018 | Shapiro |
| 2003/0133790 A1* | 7/2003 | Darkins, Jr. ............... F01D 9/04 415/139 |
| 2017/0002676 A1* | 1/2017 | Sippel ................... F01D 25/246 |
| 2018/0080334 A1 | 3/2018 | Boeke et al. |
| 2018/0080343 A1* | 3/2018 | Groleau .................... F01D 9/04 |
| 2019/0284958 A1* | 9/2019 | Schilling ............... F01D 25/246 |

FOREIGN PATENT DOCUMENTS

WO  WO-2015191186 A1 * 12/2015 ........... F01D 25/246

* cited by examiner

*Primary Examiner* — Igor Kershteyn
*Assistant Examiner* — Elton K Wong
(74) *Attorney, Agent, or Firm* — Dority & Manning, P.A.

(57) ABSTRACT

A shroud assembly for gas turbine engine defining an axial direction, a radial direction, and a circumferential direction includes a shroud segment extending substantially along the circumferential direction and including a forward wall and an aft wall spaced along the axial direction from one another and defining a cavity therebetween; and a hanger assembly including a first attachment member and a seal member, the first attachment member attached to one of the forward wall or the aft wall of the shroud segment, and the seal member positioned within the cavity and interference fit against the other of the forward wall or the aft wall of the shroud segment.

20 Claims, 5 Drawing Sheets

SHROUD SEALING FOR A GAS TURBINE ENGINE

FEDERALLY SPONSORED RESEARCH

This invention was made with government support. The U.S. government may have certain rights in the invention.

FIELD

The present subject matter relates generally to gas turbine engines. More particularly, the present subject matter relates to shroud assemblies for gas turbine engines.

BACKGROUND

Gas turbine engine performance and efficiency can be improved by increased combustion gas temperatures. However, increased combustion temperatures can negatively impact gas turbine engine components, for example, by increasing the likelihood of material failures. Accordingly, high temperature materials, such as ceramic matrix composite (CMC) materials, are being used for various components of the engine. In particular, shroud assemblies defining an outer boundary of the core air flowpath of the engine and circumferentially enclosing the rotor blades of various compressor and/or turbine stages of an engine can be formed of CMC material. For example, a shroud segment may be formed of a SiC/Si—SiC (fiber/matrix) CMC material.

Despite the use of CMC materials for some components of shroud assemblies, shroud assemblies may include mounts (such as hangers) formed of other materials. A thermal expansion mismatch between the mounts and the shroud segments may require relatively complex and large mounts that take up more room than desired in the engine and add additional weight and cost to the engine.

Therefore, an improved shroud assembly for a gas turbine would be desirable. In particular, a shroud assembly that effectively mounts the shroud segments while reducing a radial footprint of the shroud assembly would be beneficial.

BRIEF DESCRIPTION

Aspects and advantages of the invention will be set forth in part in the following description, or may be obvious from the description, or may be learned through practice of the invention.

In one exemplary embodiment of the present disclosure, a shroud assembly for a gas turbine engine defining an axial direction, a radial direction, and a circumferential direction is provided. The assembly includes a shroud segment extending substantially along the circumferential direction and including a forward wall and an aft wall spaced along the axial direction from one another and defining a cavity therebetween; and a hanger assembly including a first attachment member and a seal member, the first attachment member attached to one of the forward wall or the aft wall of the shroud segment, and the seal member positioned within the cavity and interference fit against the other of the forward wall or the aft wall of the shroud segment.

In certain exemplary embodiments the shroud segment is formed of a ceramic matrix composite material.

For example, in certain exemplary embodiments the hanger assembly is formed of a metal material defining a first coefficient of thermal expansion, wherein ceramic matrix composite material forming the shroud segment defines a second coefficient of thermal expansion, and wherein the first coefficient of thermal expansion is greater than the second coefficient of thermal expansion.

In certain exemplary embodiments the seal member of the hanger assembly defines a first interference deflection at a reference non-operational temperature, wherein the seal member of the hanger assembly defines a second interference deflection at a reference operational temperature, and wherein the second interference deflection is greater than the first interference deflection.

In certain exemplary embodiments the first attachment member of the hanger assembly is attached to the forward wall of the shroud segment, and wherein the seal member of the hanger assembly is interference fit against the aft wall of the shroud segment.

For example, in certain exemplary embodiments the hanger assembly further includes a second attachment member, wherein the seal member is a second seal member of the second attachment member, wherein the first attachment member includes a forward portion and a first seal member, wherein the forward portion is coupled to the forward wall of the shroud segment, wherein the first seal member of the first attachment member is positioned within the cavity defined between the forward wall and the aft wall of the shroud segment, and wherein the first seal member of the first attachment member is interference fit against the forward wall of the shroud segment.

For example, in certain exemplary embodiments the aft wall of the hanger assembly defines a height along the radial direction, wherein the second seal member defines a length, and wherein the length of the second seal member is greater than the height of the aft wall of the hanger assembly.

For example, in certain exemplary embodiments the second attachment member is coupled to the aft wall of the shroud segment on an aft side of the aft wall of the shroud segment.

For example, in certain other exemplary embodiments the shroud segment further includes a shroud body with the forward wall and aft wall extending from the shroud body, wherein the aft wall defines an opening extending therethrough, wherein the second attachment member is coupled to the aft wall using the opening extending therethrough, wherein the second seal member defines a distal end contacting the aft wall at a location between the opening defined by the aft wall and a junction between the aft wall the shroud body.

In certain exemplary embodiments the hanger assembly includes a hanger attachment configured to attach the hanger assembly to a structural member of the gas turbine engine, and wherein the seal member of the hanger assembly extends from the hanger attachment.

For example, in certain exemplary embodiments the shroud segment further includes a shroud body, wherein the aft wall of the hanger assembly defines an aft wall height along the radial direction, and wherein the shroud assembly defines a shroud assembly height along the radial direction between the shroud body and the hanger attachment, and wherein a ratio of the aft wall height to shroud assembly height is at least about 0.4:1 and up to about 0.9:1.

In another exemplary embodiment of the present disclosure, a gas turbine engine defining an axial direction, a radial direction, and a circumferential direction is provided. The gas turbine engine includes a compressor section, a combustion section, and a turbine section in serial flow relationship and together defining a core air flowpath; and a shroud assembly positioned in at least one of the compressor section and the turbine section and at least partially defining the core air flowpath, the shroud assembly including a shroud segment extending substantially along the circumferential direction and including a forward wall and an aft wall spaced along the axial direction from one another and defining a cavity therebetween; and a hanger assembly including a first attachment member and a seal member, the first attachment member attached to one of the forward wall or the aft wall of the shroud segment, and the second attachment member positioned within the cavity and interference fit against the other of the forward wall or the aft wall of the shroud segment.

In certain exemplary embodiments the shroud assembly defines a portion of the core air flowpath extending through the turbine section of the gas turbine engine.

In certain exemplary embodiments the gas turbine engine further includes a structural member, wherein the hanger assembly includes a hanger attachment coupling the hanger assembly to the structural member, and wherein the seal member of the hanger assembly extends from the hanger attachment.

In certain exemplary embodiments the shroud segment is formed of a ceramic matrix composite material.

In certain exemplary embodiments the hanger assembly is formed of a metal material defining a first coefficient of thermal expansion, wherein ceramic matrix composite material forming the shroud segment defines a second coefficient of thermal expansion, and wherein the first coefficient of thermal expansion is greater than the second coefficient of thermal expansion.

In certain exemplary embodiments the first attachment member of the hanger assembly is attached to the forward wall of the shroud segment, wherein the seal member of the hanger assembly is interference fit against the aft wall of the shroud segment, wherein the hanger assembly further includes a second attachment member, wherein the seal member is a second seal member of the second attachment member, wherein the first attachment member includes a forward portion and first seal member, wherein the forward portion is coupled to the forward wall of the shroud segment, wherein the first seal member of the first attachment member is positioned within the cavity defined between the forward wall and the aft wall of the shroud segment, and wherein the first seal member of the first attachment member is interference fit against the forward wall of the shroud segment.

In another exemplary embodiment of the present disclosure, a hanger assembly for a gas turbine engine defining an axial direction, a radial direction, and a circumferential direction is provided. The hanger assembly includes a first attachment member including a forward portion and a first seal member, the forward portion and first seal member defining a first gap therebetween for receipt of a forward wall of a shroud segment of the gas turbine engine; and a second attachment member including an aft portion and a second seal member, the aft portion and second seal member defining a second gap therebetween for receipt of an aft wall of the shroud segment of the gas turbine engine, the second seal member sloped towards the aft portion of the second attachment member such that the second seal member is interference fit against the aft wall of the shroud segment when installed in the gas turbine engine.

In certain exemplary embodiments the hanger assembly is formed of a metal material.

In certain exemplary embodiments the first seal member is sloped towards the forward portion of the first attachment member such that the first seal member is interference fit against the forward wall of the shroud segment when installed in the gas turbine engine.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Figure 1:
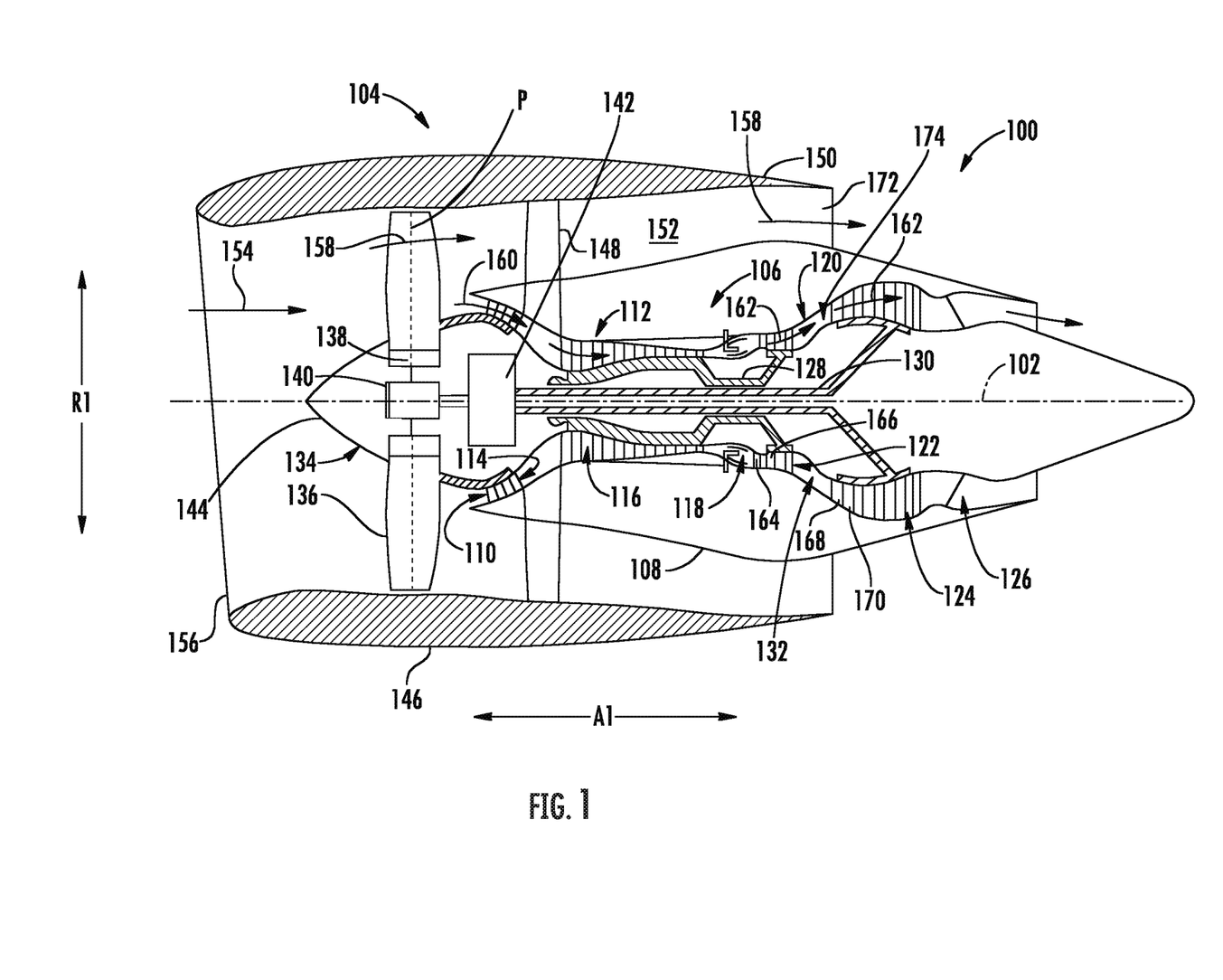
FIG. 1 is a schematic cross-sectional view of an exemplary gas turbine engine according to various embodiments of the present subject matter.

Referring now to the drawings, FIG. 1 is a schematic cross-sectional view of a gas turbine engine 100 in accordance with an exemplary embodiment of the present disclosure. More particularly, for the embodiment of FIG. 1, the gas turbine engine 100 is an aeronautical, high-bypass turbofan jet engine configured to be mounted to an aircraft, such as in an under-wing configuration or tail-mounted configuration. As shown in FIG. 1, the gas turbine engine 100 defines an axial direction A (extending parallel to or coaxial with a longitudinal centerline 102 provided for reference), a radial direction R, and a circumferential direction C1 (i.e., a direction extending about the axial direction A; see FIG. 3). In general, the gas turbine engine 100 includes a fan section 104 and a turbomachine 106 disposed downstream from the fan section 104.

The exemplary turbomachine 106 depicted generally includes a substantially tubular outer casing 108 that defines an annular inlet 110. The outer casing 108 encases, in serial flow relationship, a compressor section 112 including a first, booster or LP compressor 114 and a second, HP compressor 116; a combustion section 118; a turbine section 120 including a first, HP turbine 122 and a second, LP turbine 124; and a jet exhaust nozzle section 126. A HP shaft or spool 128 drivingly connects the HP turbine 122 to the HP compressor 116. ALP shaft or spool 130 drivingly connects the LP turbine 124 to the LP compressor 114. The compressor section, combustion section 118, turbine section, and jet exhaust nozzle section 126 together define a core air flowpath 132 through the turbomachine 106.

Referring still the embodiment of FIG. 1, the fan section 104 includes a variable pitch fan 134 having a plurality of fan blades 136 coupled to a disk 138 in a circumferentially spaced apart manner. As depicted, the fan blades 136 extend outwardly from disk 138 generally along the radial direction R. Each fan blade 136 is rotatable relative to the disk 138 about a pitch axis P by virtue of the fan blades 136 being operatively coupled to a suitable actuation member 140 configured to collectively vary the pitch of the fan blades 136, e.g., in unison. The fan blades 136, disk 138, and actuation member 140 are together rotatable about the longitudinal centerline 102 by LP shaft 130 across a power gear box 142. The power gear box 142 includes a plurality of gears for stepping down the rotational speed of the LP shaft 130 to a more efficient rotational fan speed.

Referring still to the exemplary embodiment of FIG. 1, the disk 138 is covered by rotatable front nacelle 144 aerodynamically contoured to promote an airflow through the plurality of fan blades 136. Additionally, the exemplary fan section 104 includes an annular fan casing or outer nacelle 146 that circumferentially surrounds the fan 134 and/or at least a portion of the turbomachine 106. Moreover, for the embodiment depicted, the nacelle 146 is supported relative to the turbomachine 106 by a plurality of circumferentially spaced outlet guide vanes 148. Further, a downstream section 150 of the nacelle 146 extends over an outer portion of the turbomachine 106 so as to define a bypass airflow passage 152 therebetween.

During operation of the gas turbine engine 100, a volume of air 154 enters the gas turbine engine 100 through an associated inlet 156 of the nacelle 146 and/or fan section 104. As the volume of air 154 passes across the fan blades 136, a first portion of the air 154 as indicated by arrows 158 is directed or routed into the bypass airflow passage 152 and a second portion of the air 154 as indicated by arrow 160 is directed or routed into the LP compressor 114. The pressure of the second portion of air 160 is then increased as it is routed through the high pressure (HP) compressor 116 and into the combustion section 118.

Referring still to FIG. 1, the compressed second portion of air 160 from the compressor section mixes with fuel and is burned within the combustion section 118 to provide combustion gases 162. The combustion gases 162 are routed from the combustion section 118 along the hot gas path 174, through the HP turbine 122 where a portion of thermal and/or kinetic energy from the combustion gases 162 is extracted via sequential stages of HP turbine stator vanes 164 that are coupled to the outer casing 108 and HP turbine rotor blades 166 that are coupled to the HP shaft or spool 128, thus causing the HP shaft or spool 128 to rotate, thereby supporting operation of the HP compressor 116. The combustion gases 162 are then routed through the LP turbine 124 where a second portion of thermal and kinetic energy is extracted from the combustion gases 162 via sequential stages of LP turbine stator vanes 168 that are coupled to the outer casing 108 and LP turbine rotor blades 170 that are coupled to the LP shaft or spool 130, thus causing the LP shaft or spool 130 to rotate, thereby supporting operation of the LP compressor 114 and/or rotation of the fan 134.

The combustion gases 162 are subsequently routed through the jet exhaust nozzle section 126 of the turbomachine 106 to provide propulsive thrust. Simultaneously, the pressure of the first portion of air 158 is substantially increased as the first portion of air 158 is routed through the bypass airflow passage 152 before it is exhausted from a fan nozzle exhaust section 172 of the gas turbine engine 100, also providing propulsive thrust. The HP turbine 122, the LP turbine 124, and the jet exhaust nozzle section 126 at least partially define a hot gas path 174 for routing the combustion gases 162 through the turbomachine 106.

It will be appreciated that the exemplary gas turbine engine 100 depicted in FIG. 1 is by way of example only, and that in other exemplary embodiments, the gas turbine engine 100 may have any other suitable configuration. For example, the gas turbine engine may include any suitable number and/or configuration of compressors, turbines, shafts or spools, etc. Further, although depicted as including a variable pitch fan 124 and a power gearbox 142, in other embodiments, the gas turbine engine may include a fixed pitch fan, a direct drive configuration, etc. Additionally, or alternatively, aspects of the present disclosure may be utilized with any other suitable aeronautical gas turbine engine, such as a turboshaft engine, turboprop engine, turbojet engine, etc. Further, aspects of the present disclosure may further be utilized with any other land-based gas turbine engines, such as a power generation gas turbine engine, or any aeroderivative gas turbine engine, such as a nautical gas turbine engine.

Figure 2:
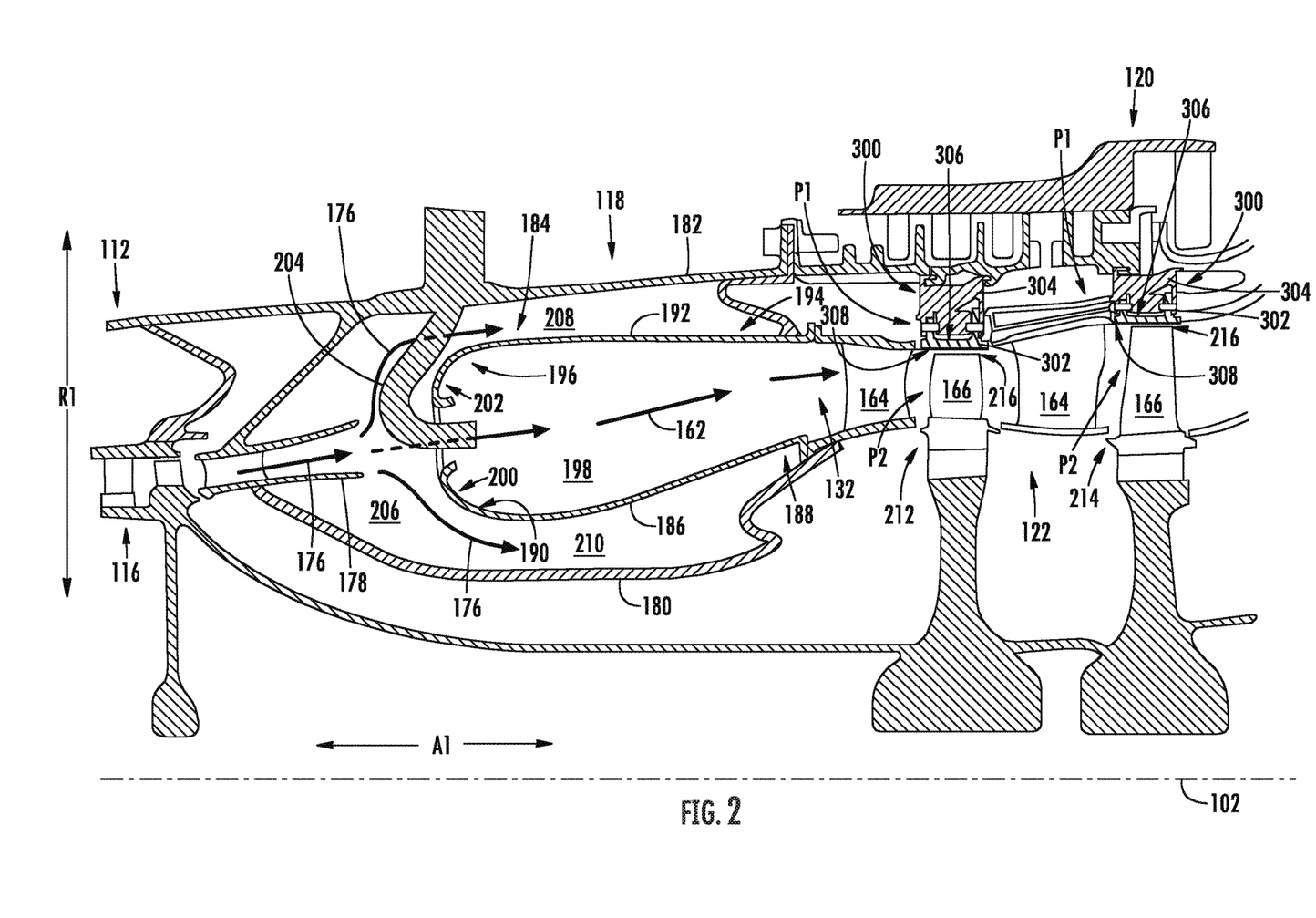
FIG. 2 is a cross-sectional view of a compressor section, a combustion section, and a high pressure turbine section of the gas turbine engine shown in FIG. 1.

Referring now to FIG. 2, FIG. 2 provides a side cross-sectional view of the compressor section 112, combustion section 118, and the turbine section 120 of the turbomachine 106 of FIG. 1. More specifically, the rear end of the HP compressor 116, the combustor section 118, and the forward end of the HP turbine 122 are illustrated.

Compressed air 176 exits the HP compressor 116 through a diffuser 178 located at the rear end or outlet of the HP compressor 116 and diffuses into the combustion section 118. The combustion section 118 of turbomachine 106 is annularly encased by radially inner and outer combustor casings 180, 182. The radially inner combustor casing 180 and the radially outer combustor casing 182 both extend generally along the axial direction A and surround a combustor assembly 184 in annular rings. The inner and outer combustor casings 180, 182 are joined together at annular diffuser 178 at the forward end of the combustion section 118.

As shown, the combustor assembly 184 generally includes an inner liner 186 extending between a rear end 188 and a forward end 190 generally along the axial direction A, as well as an outer liner 192 also extending between a rear end 194 and a forward end 196 generally along the axial direction A. The inner and outer liners 186, 192 together at least partially define a combustion chamber 198 therebetween. The inner and outer liners 186, 192 are each attached to or formed integrally with an annular dome. More particularly, the annular dome includes an inner dome section 200 formed integrally with the forward end 190 of the inner liner 186 and an outer dome section 202 formed generally with the forward end 196 of the outer liner 192. Further, the inner and outer dome section 200, 202 may each be formed integrally (or alternatively may be formed of a plurality of components attached in any suitable manner) and may each extend along the circumferential direction C1 to define an annular shape. It should be appreciated, however, that in other embodiments, the combustor assembly 184 may not include the inner and/or outer dome sections 200, 202; may include separately formed inner and/or outer dome sections 200, 202 attached to the respective inner liner 186 and outer liner 192; or may have any other suitable configuration.

Referring still to FIG. 2, the combustor assembly 184 further includes a plurality of fuel air mixers 204 spaced along the circumferential direction C1 and positioned at least partially within the annular dome. More particularly, the plurality of fuel air mixers 204 are disposed at least partially between the outer dome section 202 and the inner dome section 200 along the radial direction R. Compressed air 176 from the compressor section 112 of the gas turbine engine 100 flows into or through the fuel air mixers 204, where the compressed air 176 is mixed with fuel and ignited to create combustion gases 162 within the combustion chamber 198. The inner and outer dome sections 200, 202 are configured to assist in providing such a flow of compressed air 176 from the compressor section 112 into or through the fuel air mixers 204.

As discussed above, the combustion gases 162 flow from the combustion chamber 198 into and through the turbine section 120 of the gas turbine engine 100, where a portion of thermal and/or kinetic energy from the combustion gases 162 is extracted via sequential stages of turbine stator vanes and turbine rotor blades within the HP turbine 122 and LP turbine 124. More specifically, as is depicted in FIG. 2, combustion gases 162 from the combustion chamber 198 flow into the HP turbine 122, located immediately downstream of the combustion chamber 198, where thermal and/or kinetic energy from the combustion gases 162 is extracted via sequential stages of HP turbine stator vanes 164 and HP turbine rotor blades 166.

As illustrated in FIG. 2, not all compressed air 176 flows into or directly through the fuel air mixers 204 and into combustion chamber 198. Some of the compressed air 176 is discharged into a plenum 206 surrounding the combustor assembly 184. Plenum 206 is generally defined between the combustor casings 180, 182 and the liners 186, 192. The outer combustor casing 182 and the outer liner 192 define an outer plenum 208 generally disposed radially outward from the combustion chamber 198. The inner combustor casing 180 and the inner liner 186 define an inner plenum 210 generally disposed radially inward with respect to the combustion chamber 198. As compressed air 176 is diffused by diffuser 178, some of the compressed air 176 flows radially outward into the outer plenum 208 and some of the compressed air 176 flows radially inward into the inner plenum 210.

The compressed air 176 flowing radially outward into the outer plenum 208 flows generally axially to the turbine section 120. Specifically, the compressed air 176 flows above the HP turbine 122 stator vanes and rotor blades 164, 166. The outer plenum 208 may extend to the LP turbine 124 (FIG. 1) as well.

As further shown in FIG. 2, the HP turbine 122 includes one or more shroud assemblies 300, each of which forms an annular shroud ring about an annular array of HP turbine rotor blades 166. In this example, an annular shroud ring is circumferentially disposed around the annular array of rotor blades 166 of a first stage 212 of HP turbine 122, and an annular ring is circumferentially disposed around the annular array of turbine rotor blades 166 of the second stage 214. In general, the shrouds or shroud segments of the shroud assemblies 300 are radially spaced from blade tips 216 of each of the rotor blades 166. The shroud assemblies 300 generally reduce radial leakage into and out of the core air flowpath 132 and may also reduce axial leakage.

Each shroud assembly 300 includes a shroud segment 302 and a hanger assembly 304. The shroud segment 302 is positioned radial outward from blade tips 216 of each of the rotor blades 166 and at least partially defines the core air flowpath 132. Each shroud segment 302 includes a radially outer side 306 and a radially inner side 308. The inner side 308 of each shroud segment 302 may include, e.g., a ceramic-based abradable material coated with an environmental barrier coating (EBC). Alternatively, however, in other embodiments, any other suitable material and/or coating may be provided on the inner side 308 of the shroud segment 302. Further, as will be explained in greater detail below, each shroud segment 302 is coupled to a corresponding hanger assembly 304. The hanger assemblies 304 couple each shroud segment 302 to a structural component of the turbomachine, and more specifically, to the outer casing 182 for the embodiment shown.

It should be noted that shroud assemblies 300 may additionally be utilized in a similar manner in the LP compressor 114, HP compressor 116, and/or LP turbine 124. Accordingly, the shroud assemblies 300 as disclosed herein are not limited to use in HP turbines 122, and rather may be utilized in any suitable section of gas turbine engine 100 or turbine engine more generally.

Figure 3:
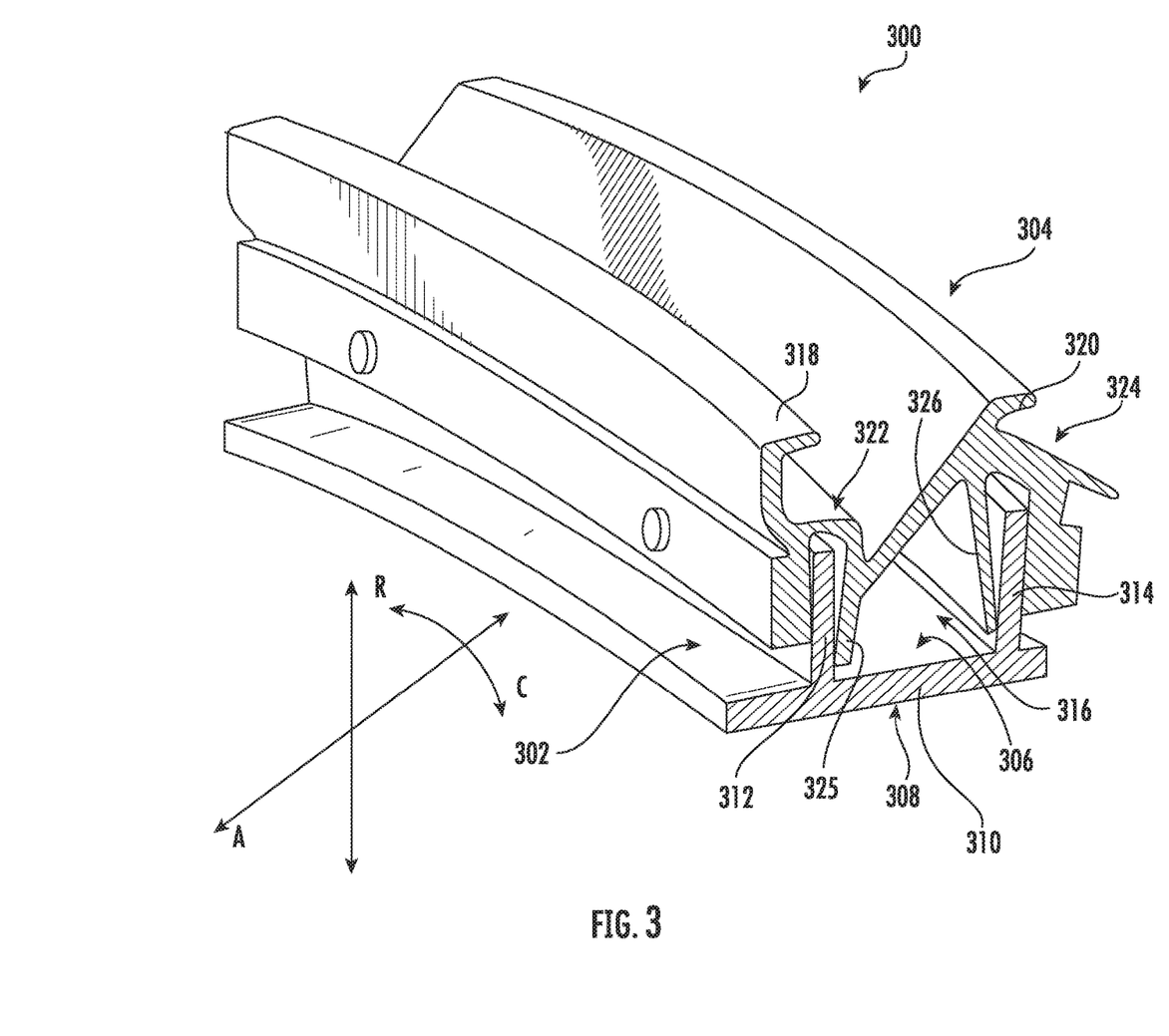
FIG. 3 is a perspective view of an exemplary shroud assembly.

Referring now to FIG. 3, FIG. 3 provides a perspective view of an exemplary shroud assembly 300. The shroud assembly 300 may be positioned in at least one of the compressor section 112 or the turbine section 120 and at least partially defines the core air flowpath 132. By way of example, the shroud assemblies 300 may be positioned outward of the rotor blades 166 of HP turbine 122 along the radial direction R and circumferentially enclosing the rotor blades 166 of HP turbine 122, as shown in FIG. 2. In other embodiments, shroud assemblies 300 may be located in other sections or locations within gas turbine engine 100.

As will be explained in greater detail below with reference to, e.g., FIG. 4, the exemplary shroud assembly 300 depicted generally includes shroud segment 302 coupled with a hanger assembly 304. Notably, the shroud segment 302 and hanger assembly 304 each generally extends along the circumferential direction C. The shroud assembly 300 may generally include a plurality of individuals shroud segments 302 and hanger assemblies 304 sequentially arranged along the circumferential direction C to collectively form a circumferential shroud assembly 300.

The shroud segment 302 generally includes a shroud body 310 defining the outer side 306 and inner side 308, with the inner side 308 defining at least in part the core air flowpath 132 (see FIGS. 1 and 2) of the gas turbine engine. Further, the shroud segment 302 includes a forward wall 312 and an aft wall 314 spaced along the axial direction A from one another and together defining a cavity 316 therebetween. Notably, each of the forward wall 312 and aft wall 314 extend outwardly from the shroud body 310 generally along the radial direction R, and further extend generally along the circumferential direction C with the shroud body 310.

Briefly, it will be appreciated that the cavity 316 is further defined by the hanger assembly 304. During operation, the cavity 316 may be fed with cooling air coming from the compressor section that bypassed the combustor, e.g., through outer plenum 208 (see FIG. 2). This air is required to cool the shroud segment 302 and the hanger assembly 304 and is usually at a pressure larger than the flowpath gas. For example, the pressure of the cavity 316 may increase with engine operating speeds as the air is received from the compressor section (and the compressor section produces higher pressure air at higher rotational speeds). Such a configuration may help prevent the hot flowpath gas from seeping radially outward into the hanger assembly 304 and/or shroud segment 302/shroud assembly cavities, potentially damaging such components. Sealing is therefore required between shroud segment 302 and the hanger assembly 304 to prevent this cooling air within the cavity 316 from escaping into the flowpath in uncontrolled manner.

Referring still to FIG. 3, the hanger assembly 304 is coupled to the shroud segment 302 and is further configured to mount the shroud segment 302 within the gas turbine engine to, e.g., a structural component of the gas turbine engine (such as an outer casing 182, as noted above with reference to FIG. 2). More specifically, the hanger assembly 304 includes a hanger attachment configured to attach the hanger assembly 304 to a structural member of the gas turbine engine, and more specifically still, includes a forward hanger attachment 318 and an aft hanger attachment 320. For the embodiment shown, the forward hanger attachment 318 and aft hanger attachment 320 are each configured as hooks. However, in other exemplary embodiments any other suitable mechanical fastener may be used (e.g., bolts, screws, etc.).

Further, the hanger assembly 304 generally includes a first attachment member 322 and a second attachment member 324, with the first attachment member 322 including a first seal member 325 and the second attachment member 324 including a second seal member 326. The first attachment member 322 is attached to one of the forward wall 312 or the aft wall 314 and the second attachment member 322 is attached to the other of the forward wall 312 or the aft wall 314. More specifically, for the embodiment shown, the first attachment member 322 of the hanger assembly 304 is attached to the forward wall 312 of the shroud segment 302 and second attachment member 322 of the hanger assembly 304 is attached to the aft wall 314. As will be explained in greater detail below, the first attachment member 322 further includes a forward portion 328 positioned externally to the cavity 316 (forward of the forward wall 312) and the first seal member 325 internally to the cavity 316 (aft of the forward wall 312) and interference fit against the forward wall 312, and the second attachment member 324 further includes an aft portion 350 positioned externally to the cavity 316 (aft of the aft wall 314) and the second seal member 326 internally to the cavity 316 (forward of the aft wall 314) and interference fit against the aft wall 314. In such a manner, it will generally be appreciated that for the embodiment depicted, the first and second seal members 235, 326 are interference fit against the forward and aft walls 312, 314, respectively, to provide the desired sealing. Further, in such a manner, it will be appreciate that the second seal member 326 is generally sloped towards the aft portion 350 of the second attachment member 324 such that the second seal member 326 is interference fit against the aft wall 314 of the shroud segment 302 when installed in the gas turbine engine, and similarly, that in at least certain embodiments, the first seal member 325 is sloped towards the forward portion 328 of the first attachment member 322 such that the first seal member 325 is interference fit against the forward wall 312 of the shroud segment 302 when installed in the gas turbine engine. Notably, as used herein, the term "sloped" refers to an effective slope of a surface of the component. For example, the second seal member 326 may include a bump or other protrusion at its distal end, such that the second seal member 326 effectively slopes, e.g., towards the aft wall 314. It will be appreciated, however, that in other embodiments, the first and/or second seal member 325, 326 may not slope towards the forward wall 312 or aft wall 314, respectively, and instead the forward and/or aft wall 312, 314 may include a bump, hump, protrusion, slope, etc. to facilitate the interference fit with the respective seal member 325, 326.

Further still, in such a manner, it will be appreciated that the forward portion 328 and first seal member 325 together define a first gap therebetween (along the axial direction A) for receipt of the forward wall 312 of the shroud segment 302 of the gas turbine engine, and similarly the aft portion 350 and second seal member 326 together define a second gap therebetween (along the axial direction A) for receipt of the aft wall 314 of the shroud segment 302 of the gas turbine engine.

Figure 4:
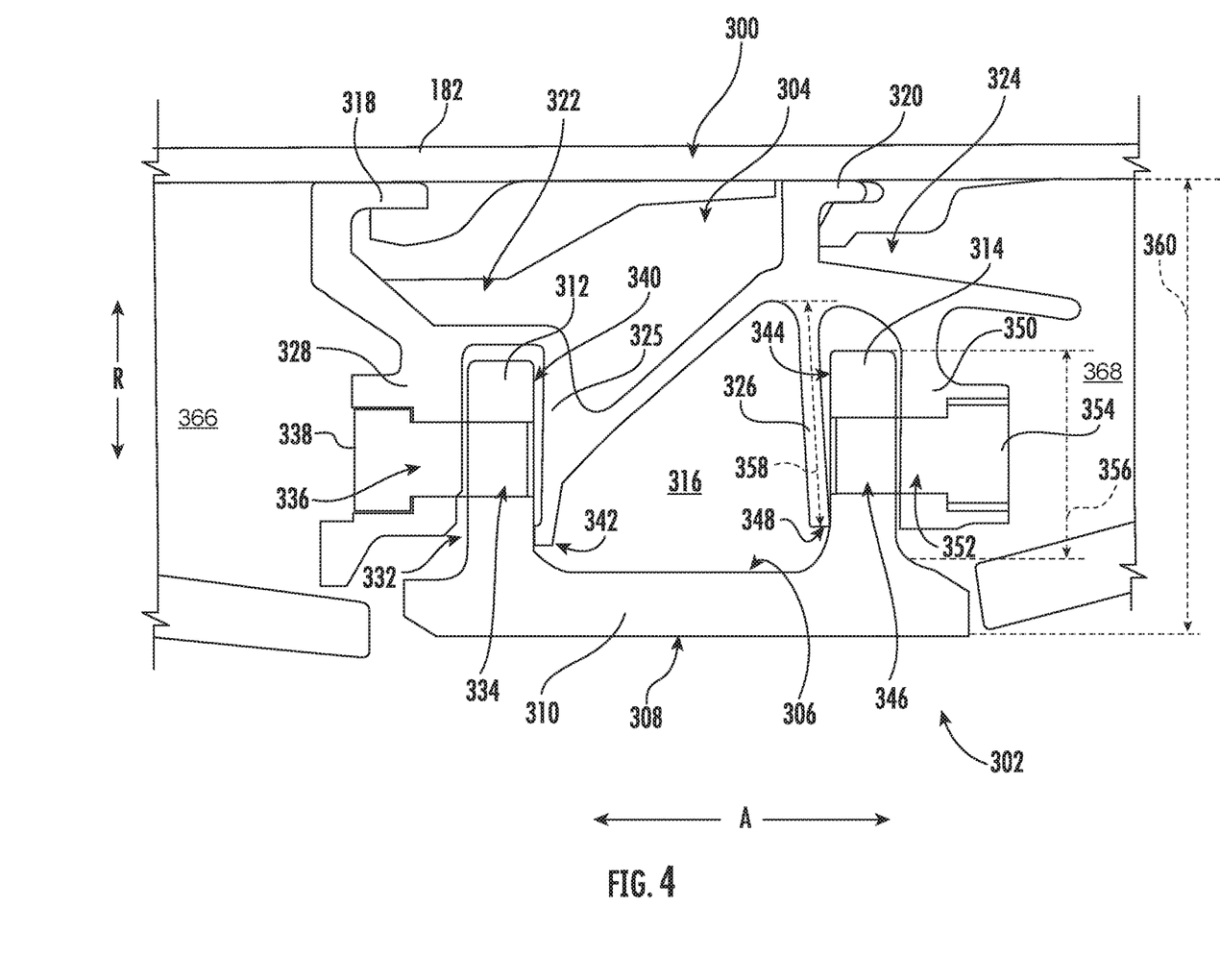
FIG. 4 is a partial side, cross-sectional view of the shroud assembly of FIG. 3.

Referring now also to FIG. 4, the shroud assembly 300 will be further explained in greater detail. Notably, FIG. 4 depicts the shroud assembly 300 installed within the gas turbine engine. Accordingly, for the embodiment shown the forward hanger attachment 318 and aft hanger attachment 320 are coupled to the structural member of the gas turbine engine, and more specifically, to the casing 182 of the gas turbine engine, mounting the shroud assembly 300 within the gas turbine engine.

As noted above, the hanger assembly 304 generally includes the first attachment member 322 and the second attachment member 324, with the first attachment member 322 including the first seal member 325 and the second attachment member 324 including the second seal member 326. Further, it will be appreciated that the forward portion 328 of the first attachment member 322 is mechanically fastened to the forward wall 312 of the shroud segment 302, and more specifically, is mechanically fastened to the forward wall 312 of the shroud segment 302 at a forward side 332 of the forward wall 312. The forward wall 312 defines one or more openings 334 extending therethrough generally along the axial direction A for the embodiment shown. Similarly, the forward portion 328 of the first attachment member 322 includes a corresponding one or more openings 336 extending therethrough generally along the axial direction A. One or more mechanical fasteners 338 are provided, extending through the one or more openings 336 of the forward portion 328 of the first attachment member 322 and the one or more openings 334 of the forward wall 312 of the shroud segment 302 to couple the two components. The one or more mechanical fasteners 338 may include one or more bolts, screws, rivets, pins, etc. More particularly, for the embodiment depicted, the mechanical fasteners 338 are fixed to the forward portion 328, but slidably received into/slidably coupled to the respective openings 334 to accommodate relative thermal growth between the components.

Referring still to the first attachment member 322 of the hanger assembly 304, the first seal member 325 of the first attachment member 322 is positioned within the cavity 316 defined by the forward wall 312 and the aft wall 314 of the shroud segment 302. The first seal member 325 of the first attachment member 322 is interference fit against the forward wall 312 of the shroud segment 302, and more specifically is interference fit against an aft side 340 of the forward wall 312 of the shroud segment 302. Notably, for the embodiment shown a distal/radially inner end 342 of the first seal member 325 of the first attachment member 322 contacts the forward wall 312 at a location between the opening 334 and the forward wall 312 and a junction between the shroud body 310 and the forward wall 312.

Referring now to the second attachment member 324, as noted, the second attachment member 324 includes the second seal member 326 interference fit against the aft wall 314 of the shroud segment 302. More specifically, the second seal member 326 is interference fit against a forward side 344 of the aft wall 314 of the shroud segment 302. As with the forward wall 312, the aft wall 314 includes one or more openings 346 extending therethrough, e.g., along the axial direction A. The second seal member 326 defines a distal end/radially inner end 348 contacting the aft wall 314 at a location between the one or more openings 346 defined by the aft wall 314 and a junction between the aft wall 314 and the shroud body 310. The interference fit of the second seal member 326 to the forward side 344 of the aft wall 314 will be discussed in greater detail, below.

Similar to the first attachment member 322, the second attachment member 324 includes an aft portion 350 mechanically fastened to the aft wall 314. The aft portion 350 of the second attachment member 324 defines one or more openings 350 corresponding to the one or more openings 346 defined in the aft wall 314 of the shroud segment 302. One or mechanical fasteners 354 are provided, extending through the one or more openings 352 of the aft portion 350 of the second attachment member 324 and the one or more openings 346 of the aft wall 314 of the shroud segment 302 to couple the two components. The one or more mechanical fasteners 354 may include one or more bolts, screws, rivets, pins, etc. More particularly, for the embodiment depicted, the mechanical fasteners 354 are fixed to the aft portion 350, but slidably received into/slidably coupled to the respective openings 346 to accommodate relative thermal growth between the components.

Further, for the embodiment shown the second seal member 326 extends generally inwardly from the aft hanger attachment 320, and more specifically, for the embodiment shown, generally inwardly along the radial direction R. Moreover, it will be appreciated that the aft wall 314 of the hanger assembly 304 defines a height 356 along the radial direction R. Similarly, the second seal member 326 of the second attachment member 324 of the hanger assembly 304 defines a length 358. The length 358 of the second seal member 326 is substantially equal to or greater than the height 356 of the aft wall 314 of the hanger assembly 304, such as up to about five times the height 356 of the aft wall 314 in at least certain exemplary embodiments.

As will be appreciated, a shroud assembly 300 configured in accordance with one or more of the exemplary aspect described above may allow for the shroud assembly 300 to take up a relatively small radial footprint within the gas turbine engine. For example, for the embodiment shown, it will be appreciated that the shroud assembly 300 further defines a shroud assembly height 360 along the radial direction R between the shroud body 310 (or rather the inner side 308 of the shroud body 310) and the hanger attachment, such as the forward hanger attachment 318 or the aft hanger attachment 320 (whichever results in the larger height 360). For the embodiment shown, a ratio of the height 356 of the aft wall 314 to the height 360 of the shroud assembly 300 is at least about 0.4:1 and up to about 1:1.

Further, it will be appreciated that the exemplary shroud assembly 300 described herein is configured to provide an effective seal against the forward wall 312 and/or aft wall 314 of the shroud segment 302 despite the relatively low radial footprint. Such is accomplished, for the embodiment shown, by leveraging the material properties of the components utilized, as well as the arrangement of such components. For example, for the embodiment depicted, the shroud segment 302 is formed of a ceramic matrix composite material. The ceramic matrix composite material of the shroud segment 302 defines a first coefficient of thermal expansion. By contrast, the hanger assembly 304 is formed of a material defining a second coefficient of thermal expansion. For example, the hanger assembly 304 may be formed of a metal material. As such, the second coefficient of thermal expansion (i.e., of the hanger assembly 304) is greater than the first coefficient thermal expansion (i.e., of the ceramic matrix composite material of the shroud segment 302).

Therefore, during operation of the gas turbine engine within which the shroud assembly 300 is installed, the hanger assembly 304 expands relative to the shroud segment 302 as the temperatures increase, such that the first seal member 325 is pressed against the inner side of 340 of the forward wall 312, and the second seal member 326 is pressed against the inner side 308 of the aft wall 314 with greater force as the temperature of the components rises (increasing the effectiveness of the seal member 325, 326 in forming a seal with the forward wall 312 and aft wall 314, respectively).

Figure 5:
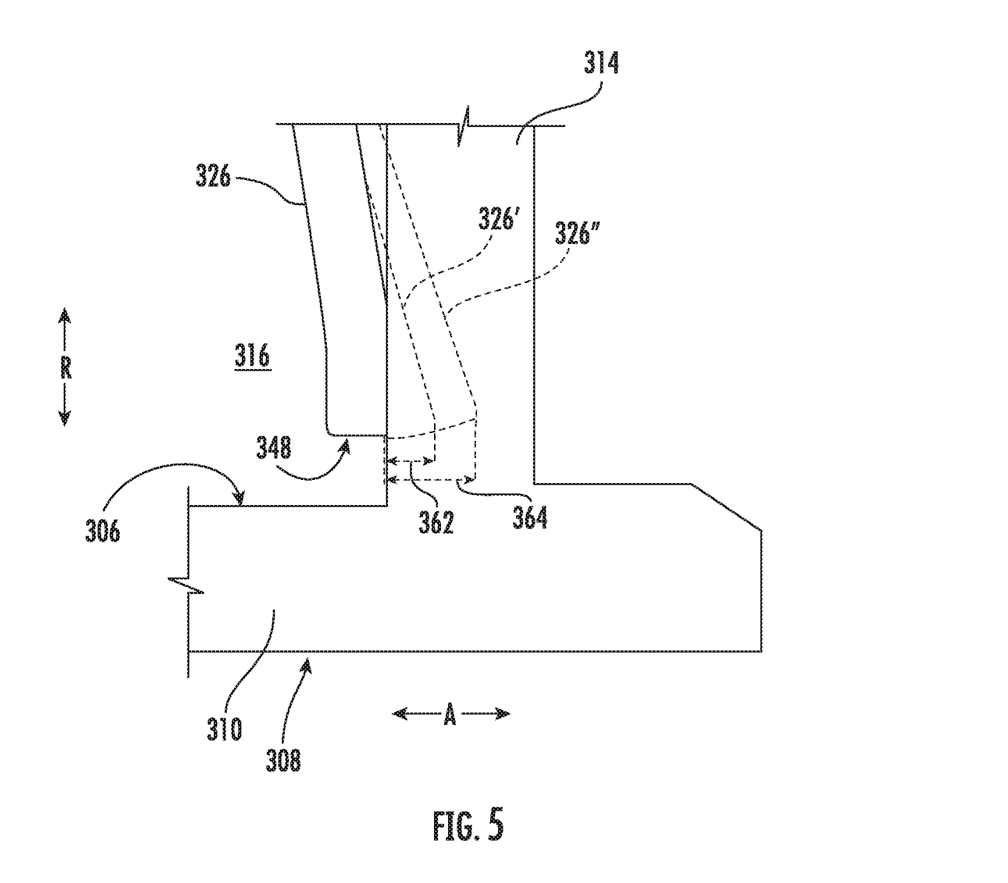
FIG. 5 is a close-up, cross-sectional view of a section of the shroud assembly of FIG. 4.

More specifically, referring now briefly to FIG. 5, a close-up view of the second seal member 326 of the hanger assembly 304 and the aft wall 314 of the shroud segment 302 is depicted. As shown, the second seal member 326 is interference fit against the aft wall 314 of the shroud segment 302. More specifically, the second seal member 326 is installed such that is deflected from its natural position. The amount of deflection may be referred to as the "interference deflection." In order to illustrate the amount of interference deflection, a first position 326' of the second seal member 326 is depicted in phantom. The first position 326' of the second seal member 326 is that of the second seal member 326 when the components are exposed to a reference non-operational temperature, such as a standard day temperature (such as seventy degrees Fahrenheit). The second seal member 326 of the hanger assembly 304 defines a first interference deflection 362 at the reference non-operational temperature. In at least some embodiments, the first interference deflection 362 may be at least about 0.1 millimeters, such as greater than or equal to 0.2 millimeters, 0.25 millimeters, or 0.35 millimeters, or up to about 10 millimeters.

A second position 326" of the second seal member 326 is also depicted in phantom. The second position 326" of the second seal member 326 is that of the second seal member 326 when the components are exposed to a reference operational temperature, such as a cruising operational temperature of the components. The second seal member 326 of the hanger assembly 304 defines a second interference deflection 364 at the reference operational temperature. The second interference deflection 364 is greater than the first interference deflection 362, such as at least about 5% greater, at least about 10% greater, at least about 20% greater, at least about 30% greater, at least about 50% greater, such as up to about 500% greater.

As will be appreciated, with an increase in interference deflection, an increased contact pressure between the second seal member 326 and aft wall 314 of the shroud segment 302 is generated. With the increased contact pressure, an increase in the effectiveness of the seal between the second seal member 326 and the aft wall 314 is provided. Accordingly, with the increase in temperature during operation of the gas turbine engine, an increase of the effectiveness of the seal is provided.

Notably, although not depicted in FIG. 5, it will be appreciated that the first seal member 325 of the first attachment member 322 may have an interference fit with the forward wall 312 configured in substantially the same manner. As such, it will be appreciated that with an increase in interference deflection, an increased contact pressure between the first seal member 325 and forward wall 312 of the shroud segment 302 is generated. With the increased contact pressure, an increase in the effectiveness of the seal between the first seal member 325 and the forward wall 312 is provided. Accordingly, with the increase in temperature during operation of the gas turbine engine, an increase of the effectiveness of the seal is provided.

Referring back to FIG. 4, it will be appreciated that the positioning of the first seal member 325 and the second seal member 326 may further have the benefit of increasing an effectiveness of the seals formed with the forward wall 312 and aft wall 314, respectively, due to an increase in pressure within the cavity 316 during operation of the gas turbine engine within which the shroud assembly 300 is installed.

More specifically, it will be appreciated that the shroud assembly 300 defines at least in part (e.g., with other components of the engine) a forward buffer cavity 366 and an aft buffer cavity 368. As the gas turbine engine operates, a pressure within the cavity 316 increases by virtue of the compressed cooling air received (e.g., from the outer plenum 208; see FIG. 2) as compared to the pressures within the forward and aft buffer cavities 366, 368, respectively. For example, the pressure differential between the cavity 316 and the buffer cavities 366, 368 generally further increases with an increased engine power (as noted above; i.e., with increased rotational speed, temperature and absolute pressures). Moreover, the increase in delta pressure between the cavity 316 and the aft buffer cavity 368 will tend to deflect the second seal member 326 in the aft direction against the aft shroud wall 314, and therefore will increase the contact force and contact pressure at an aft sealing surface of the second seal member 326. Similarly, the increase in delta pressure between the cavity 316 and the forward buffer cavity 366 will tend to deflect the first seal member 325 in the aft direction against the forward shroud wall 312, and therefore will increase the contact force and contact pressure at a forward sealing surface of the first seal member 325. Further, it will generally be appreciated that a pressure in the forward buffer cavity 366 is generally larger than a pressure in the aft buffer cavity 328. As such, the whole shroud assembly 300 will generally be pushed in the aft direction by the gas pressure and therefore a total contact force on the first seal member 325 is generally larger than the on the second seal member 326.

It will be appreciated that both mechanisms for the increase in contact pressure at the sealing surfaces: differential thermal growth and differential pressure between cavity 316 and buffer cavities 366, 368, allow for the use of a very small initial interference at assembly between hanger assembly 304 and shroud segments 302. This overall behavior significantly eases the assembly of the components and may allow for the ease of required machining tolerances that would otherwise be required to be achieved for: assembly of the components, effective sealing when the engine is operating, and support of the shroud assembly 300 in all operating conditions.

It will be appreciated, however, that the exemplary shroud assembly 300 depicted in, e.g., FIGS. 3 through 5 is provided by way of example only. In other embodiments, the shroud assembly 300 may have any other suitable configuration. For example, in other embodiments, the shroud assembly 300 may have any other suitable attachment members for attaching the shroud assembly 300 to the structural component of the gas turbine engine, any other suitable first attachment member 322, any other suitable mechanical fastening configuration or design for attaching the shroud segment 302 to the hanger assembly 304, any other suitably sized components (e.g., wall heights, seal member lengths, shroud assembly heights, etc.), etc. Further, in other exemplary embodiments the first attachment member 322 may attach to the aft wall 314, and the second seal member 326 may be interference fit against forward wall 312.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A shroud assembly for a gas turbine engine defining an axial direction, a radial direction, and a circumferential direction, the shroud assembly comprising:
  a shroud segment extending substantially along the circumferential direction and comprising a forward wall and an aft wall spaced along the axial direction from one another and defining a cavity therebetween; and a hanger assembly comprising a first attachment member and a second attachment member, wherein the first attachment member comprises a forward portion and a first seal member, wherein the forward portion is attached to the forward wall of the shroud segment and the first seal member is positioned within the cavity and interference fit against the forward wall of the shroud segment, and wherein the second attachment member comprises a second seal member positioned within the cavity and interference fit against the aft wall of the shroud segment, and wherein the second seal member is sloped towards the aft wall of the shroud segment.

2. The shroud assembly of claim 1, wherein the shroud segment is formed of a ceramic matrix composite material.

3. The shroud segment of claim 2, wherein the hanger assembly is formed of a metal material defining a first coefficient of thermal expansion, wherein ceramic matrix composite material forming the shroud segment defines a second coefficient of thermal expansion, and wherein the first coefficient of thermal expansion is greater than the second coefficient of thermal expansion.

4. The shroud assembly of claim 1, wherein the second seal member of the hanger assembly defines a first interference deflection at a reference non-operational temperature, wherein the second seal member of the hanger assembly defines a second interference deflection at a reference operational temperature, and wherein the second interference deflection is greater than the first interference deflection.

5. The shroud assembly of claim 4, wherein the first interference deflection at the reference non-operational temperature is at least 0.1 millimeters.

6. The shroud assembly of claim 4, wherein the second interference deflection at the reference operational temperature is at least 5% greater than the first interference deflection.

7. The shroud assembly of claim 1, wherein the aft wall of the shroud segment defines a height along the radial direction, wherein the second seal member defines a length, and wherein the length of the second seal member is greater than the height of the aft wall of the shroud segment.

8. The shroud assembly of claim 1, wherein the second attachment member is attached to the aft wall of the shroud segment on an aft side of the aft wall of the shroud segment.

9. The shroud segment of claim 8, wherein the shroud segment further comprises a shroud body with the forward wall and aft wall extending from the shroud body, wherein the aft wall defines an opening extending therethrough, wherein the second attachment member is attached to the aft wall using the opening extending therethrough, wherein the second seal member defines a distal end contacting the aft wall at a location between the opening defined by the aft wall and a junction between the aft wall the shroud body.

10. The shroud assembly of claim 1, wherein the hanger assembly includes a hanger attachment configured to attach the hanger assembly to a structural member of the gas turbine engine, and wherein the second seal member of the hanger assembly extends from the hanger attachment.

11. The shroud assembly of claim 10, the shroud segment further comprises a shroud body, wherein the aft wall of the shroud segment defines an aft wall height along the radial direction, and wherein the shroud assembly defines a shroud assembly height along the radial direction between the shroud body and the hanger attachment, and wherein a ratio of the aft wall height to shroud assembly height is at least 0.4:1 and up to 0.9:1.

12. A gas turbine engine defining an axial direction, a radial direction, and a circumferential direction, comprising:

a compressor section, a combustion section, and a turbine section in serial flow relationship and together defining a core air flowpath; and a shroud assembly positioned in at least one of the compressor section and the turbine section and at least partially defining the core air flowpath, the shroud assembly comprising:

a shroud segment extending substantially along the circumferential direction and comprising a forward wall and an aft wall spaced along the axial direction from one another and defining a cavity therebetween; and a hanger assembly comprising a first attachment member and a second attachment member, wherein the first attachment member comprises a forward portion and a first seal member, wherein the forward portion is attached to the forward wall of the shroud segment and the first seal member is positioned within the cavity and interference fit against the forward wall of the shroud segment, and wherein the second attachment member comprises a second seal member positioned within the cavity and interference fit against the aft wall of the shroud segment, and wherein the second seal member is sloped towards the aft wall of the shroud segment.

13. The gas turbine engine of claim 12, wherein the shroud assembly defines a portion of the core air flowpath extending through the turbine section of the gas turbine engine.

14. The gas turbine engine of claim 12, further comprising:

a structural member, wherein the hanger assembly includes a hanger attachment coupling the hanger assembly to the structural member, and wherein the second seal member of the hanger assembly extends from the hanger attachment.

15. The gas turbine engine of claim 12, wherein the shroud segment is formed of a ceramic matrix composite material, wherein the hanger assembly is formed of a metal material defining a first coefficient of thermal expansion, wherein the ceramic matrix composite material forming the shroud segment defines a second coefficient of thermal expansion, and wherein the first coefficient of thermal expansion is greater than the second coefficient of thermal expansion.

16. The gas turbine engine of claim 12, wherein the second seal member of the hanger assembly defines a first interference deflection at a reference non-operational temperature, wherein the second seal member of the hanger assembly defines a second interference deflection at a reference operational temperature, and wherein the second interference deflection is greater than the first interference deflection.

17. The gas turbine engine of claim 12, wherein the cavity is a shroud cavity, wherein the shroud assembly further defines at least in part a forward buffer cavity positioned forward of the forward wall and an aft buffer cavity positioned aft of the aft wall, wherein the shroud cavity is configured to define a pressure greater than a pressure of the forward buffer cavity and greater than a pressure of the aft buffer cavity during operation of the gas turbine engine.

18. A hanger assembly for a gas turbine engine defining an axial direction, a radial direction, and a circumferential direction, the hanger assembly comprising:

a first attachment member comprising a forward portion and a first seal member, the forward portion and first seal member defining a first gap therebetween for receipt of a forward wall of a shroud segment of the gas turbine engine; and a second attachment member comprising an aft portion and a second seal member, the aft portion and second seal member defining a second gap therebetween for receipt of an aft wall of the shroud segment of the gas turbine engine, the second seal member configured to be interference fit against the aft wall of the shroud segment when installed in the gas turbine engine;

wherein the second seal member is sloped towards the aft portion of the second attachment member such that the second seal member is interference fit against the aft wall of the shroud segment when installed in the gas turbine engine, and wherein the first seal member is sloped towards the forward portion of the first attachment member such that the first seal member is interference fit against the forward wall of the shroud segment when installed in the gas turbine engine.

19. The hanger assembly of claim 18, wherein the hanger assembly is formed of a metal material.

20. The hanger assembly of claim 18, wherein the shroud segment is formed of a ceramic matrix composite material.

* * * * *